United States Patent [19]
Senzaki

[11] Patent Number: 6,135,684
[45] Date of Patent: Oct. 24, 2000

[54] TOOL HOLDER

[75] Inventor: Chikara Senzaki, Nara, Japan

[73] Assignee: Manyo Tool Kabushiki Kaisha, Nara, Japan

[21] Appl. No.: 09/290,381

[22] Filed: Apr. 12, 1999

[30] Foreign Application Priority Data

Dec. 4, 1998 [JP] Japan .................................. 10-344967

[51] Int. Cl.⁷ .................................................. B23B 31/02
[52] U.S. Cl. ...................... 409/234; 408/143; 408/239 R
[58] Field of Search .................................. 409/232, 234; 408/143, 238, 239 R; 279/125, 132, 157; 74/573 R, 574

[56] References Cited

U.S. PATENT DOCUMENTS

| | | | |
|---|---|---|---|
| 3,521,507 | 7/1970 | Yogus et al. ........................ | 408/239 R |
| 4,865,336 | 9/1989 | Keritsis .................................... | 409/234 |
| 5,033,923 | 7/1991 | Osawa ..................................... | 409/131 |
| 5,074,723 | 12/1991 | Massa et al. ............................ | 408/143 |
| 5,096,345 | 3/1992 | Toyomoto ................................ | 408/239 |
| 5,125,777 | 6/1992 | Osawa ..................................... | 409/234 |
| 5,407,308 | 4/1995 | Takayoshi ............................... | 409/234 |

FOREIGN PATENT DOCUMENTS

| | | | |
|---|---|---|---|
| 660784 | 5/1979 | U.S.S.R. ............................... | 408/143 |
| 95/00576 | 2/1995 | WIPO . | |

*Primary Examiner*—Daniel W. Howell
*Attorney, Agent, or Firm*—Graybeal Jackson Haley LLP

[57] ABSTRACT

A tool holder includes a holder body having a first section to be attached to a machine and a second section having a substantially constant diameter and coaxial with the first section, a ring extending around the second section, and an assembling device for removably assembling the ring to the holder body. The assembling device is releasably engaged with an inner face of the ring and an outer face of the second section to removably assemble the ring to the holder body.

10 Claims, 7 Drawing Sheets

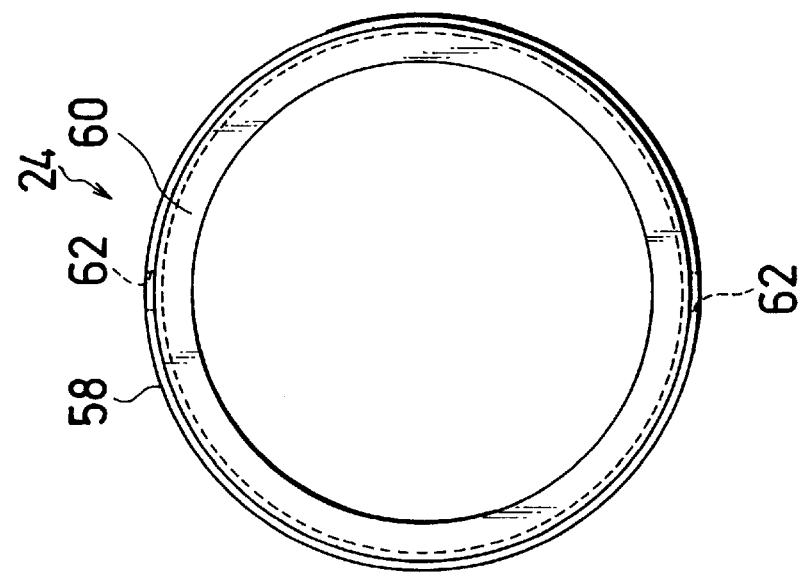
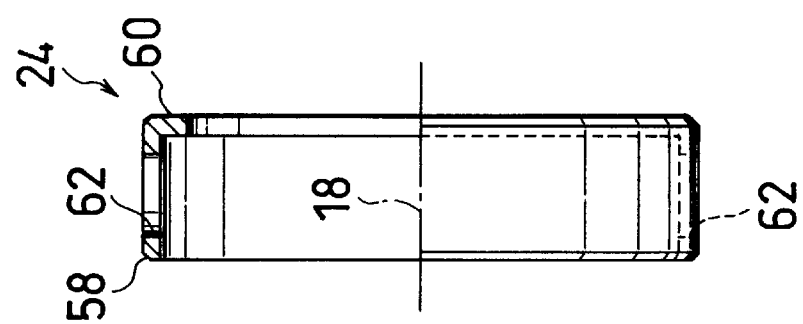
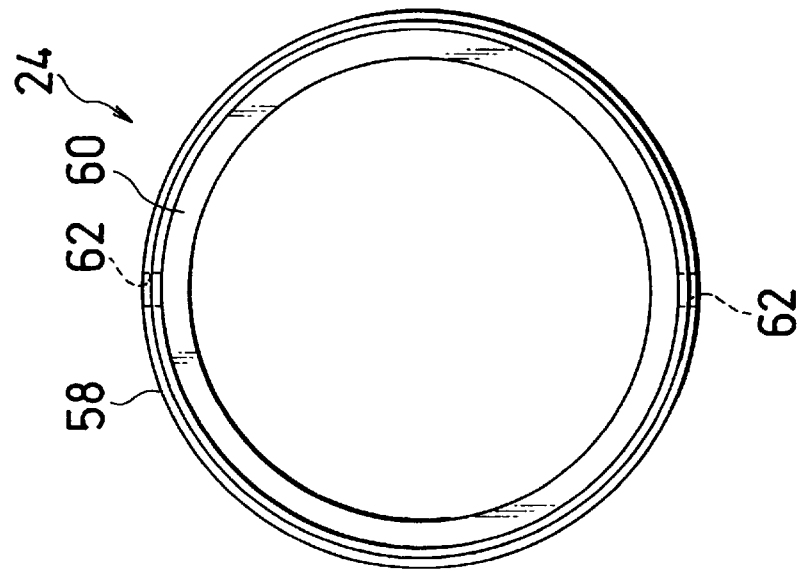

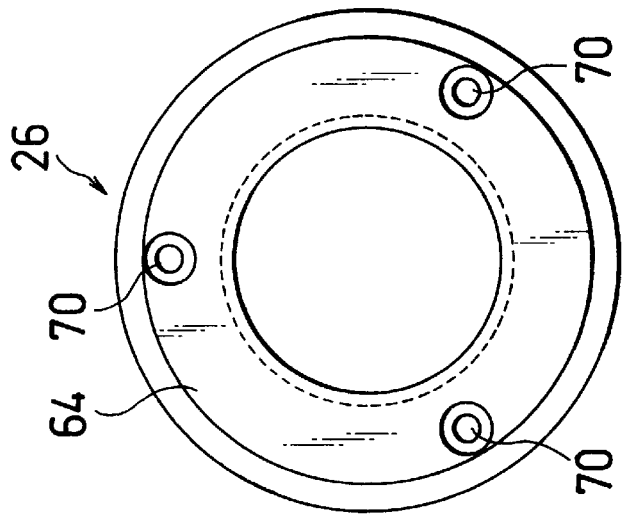
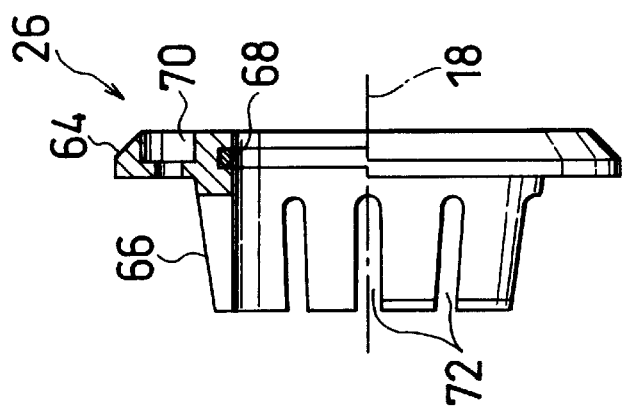
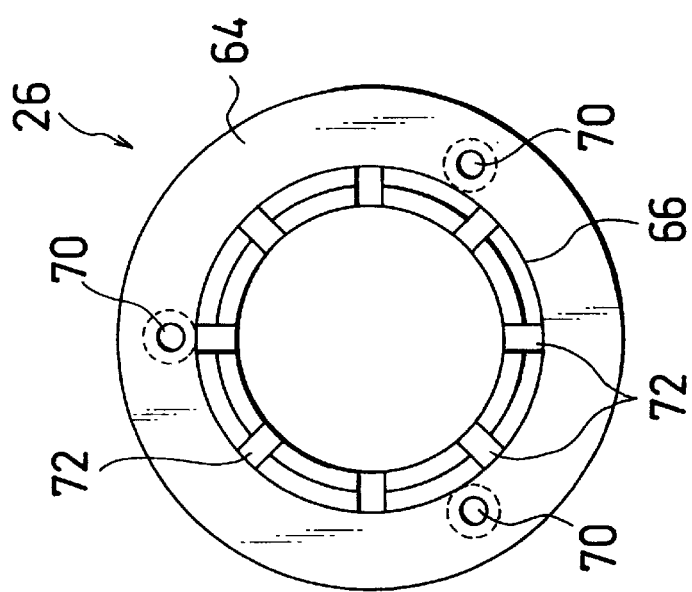

TOOL HOLDER

BACKGROUND OF THE INVENTION

1. Field of the Invention

This invention relates to a holder for a tool such as a tap, an end mill, a drill, an internal cutting tool, or an abrasive grindstone.

2. Descripyion of Prior Art

In machining by a machine tool such as a milling machine, a boring machine, a lathe or a polishing machine, the working accuracy is influenced much by the presence or absence and the magnitude of imbalance in weight, in a circumferential direction, of a rotary shaft (that is, a spindle) of a machine tool, a rotating tool or the like. Therefore, in machining of the type mentioned, it is important to reduce the imbalance of a rotary shaft and a rotating tool as much as possible in order to raise the working accuracy.

As one of tool holders which can adjust a rotary shaft and a rotating tool against an imbalance, a tool holder is available wherein a holder body having a first section of a truncated conical shape to be attached to a machine, a second section in the form of a bar coaxially exteding from the first section and a flange provided at a boundary portion between the first and second sections is used and balancing means is attached to the flange (U.S. Pat. Nos. 5,096,345, and 5,033,923 and WO 95/26258).

With the conventional tool holder, however, since the balancing means is attached to the flange of the holder body, the attached position of the balancing means to the holder body cannot be changed to an axial direction of the holder body. With such a tool holder as just described, although the position at which balancing in weight should be performed is different in the axial direction of the holder body depending upon a tool, since the adjusted position is a position fixed in the axial direction of the holder body, the tool holder cannot be applied to a tool which performs balancing at a different position.

SUMMARY OF THE INVENTION

Therefore, in a tool holder, it is important to enable to change the position at which balancing in weight should be performed.

A tool holder of the present invention comprises a holder body having a first section to be attached to a machine and a second section having a substantially constant diameter and coaxial with the first section, a ring extending around the second section, and an assembling device for removably assembling the ring to the holder body, the assembling device being releasably engaged with an inner face of the ring and an outer face of the second section to removably assemble the ring to the holder body.

When the assembling device is releasably engaged with the inner face of the ring and the outer face of the second section, the ring is assembled to the second section. On the other hand, when the engagement of the assembling device with the inner face of the ring or the outer face of the second section is cancelled, the ring is disconnected from the second section and becomes movable with respect to the holder body in its axial direction.

Therefore, the assembled position to the second section can be changed by cancelling the assemblage of the ring and the second section by the assembling device, moving the ring and the assembling device to a predetermined position in the axial direction of the tool holder, and engaging at the position, the assembling device with the ring and the second section.

The assembling device may have an annular base section continuously extending around the second section, and an engaging section extending in the axial direction of the holder body from the base section. The engaging section is disposed between the ring and the second section for engaging with the inner face of the ring and the outer face of the second section. Where this construction is employed, by moving the holder body, the ring and the assembling device relative to each other in the axial direction of the holder body to dispose the engaging section between the ring and the second section, the engaging section can be engaged with the ring and the second section to assemble the ring to the holder body. On the other hand, by moving the holder body, the ring and the assembling device relative to each other in a direction opposite to the direction described above, the assemblage of the ring and the second section by the engaging section can be cancelled to release the ring from the holder body.

The inner face of the ring or the outer face of the engaging section may have a truncated conical shape whose diameter is larger on one side than the other side of the ring in the axial direction of the holder body. Where this construction is employed, when the engaging section is inserted between the ring and the second section, the engaging section grips the second section and engages with the inner face of the ring. As a result, the ring and the second section are assembled with certainty by the engaging section, and assembly and disassembly of the ring and the second section by the engaging section are performed with certainty and with ease.

The engaging section may be divided into a plurality of tongues angularly spaced from each other around the axis of the holder body with a plurality of slits. Where this construction is employed, when the engaging section is inserted between the ring and the second section, each of the divided tongues becomes resiliently deformable. Consequently, assembly and disassembly of the ring and the second section by the engaging section can be performed with more ease and certainty.

The base section may be assembled to one face of the ring in the axial direction of the holder body by means of a plurality of screws. Where this construction is employed, since relative movement of the ring and the assembling device is prevented, loosening and cancellation of the assembled condition of the ring and the second section by the assembling device is prevented.

The ring may further have a plurality of holes opened in the outer face or one of faces in the axial direction of the holder body and spaced angularly from each other around the axis of the holder body. Where this construction is employed, by disposing a balancing member into a predetermined one or more of the holes, balancing in weight can be performed.

Where the ring has the holes opened in the outer face thereof, the tool holder may further comprise a ring-shaped cover for receiving the ring so as to close the holes in such a manner as they may be opened. Where this construction is employed, when the tool holder rotates, there is no possibility that the balancing member may jump out from the hole, which provides safety.

The cover may have one or more openings which can be aligned with the hole of the ring. Where this construction is employed, the ring and the cover can be rotated, in a condition where the ring and the cover are coupled with each other, relative to each other to align the opening of the cover with the hole of the ring. In this condition, disposition and removal of the balancing member into and from the hole can be performed.

The cover may have an inwardly directed flange held between the ring and the assembling device. Where this construction is employed, when the tool holder rotates, there is no possibility that the cover may come off the ring, which provides safety.

BRIEF DESCRIPTION OF THE DRAWINGS

FIG. 5(A) is a view showing an embodiment of a cover, and is a left-hand side elevational view;

FIG. 5(B) is a front elevational view partly in section;

FIG. 5(C) is a right-hand side elevational view;

FIG. 6(A) is a view showing an embodiment of an assembling device, and is a left-hand side elevational view;

FIG. 6(B) is a front elevational view partly in section;

FIG. 6(C) is a right-hand side elevational view;

DETAILED DESCRIPTION OF THE PREFERRED EMBODIMENTS

Figure 1:
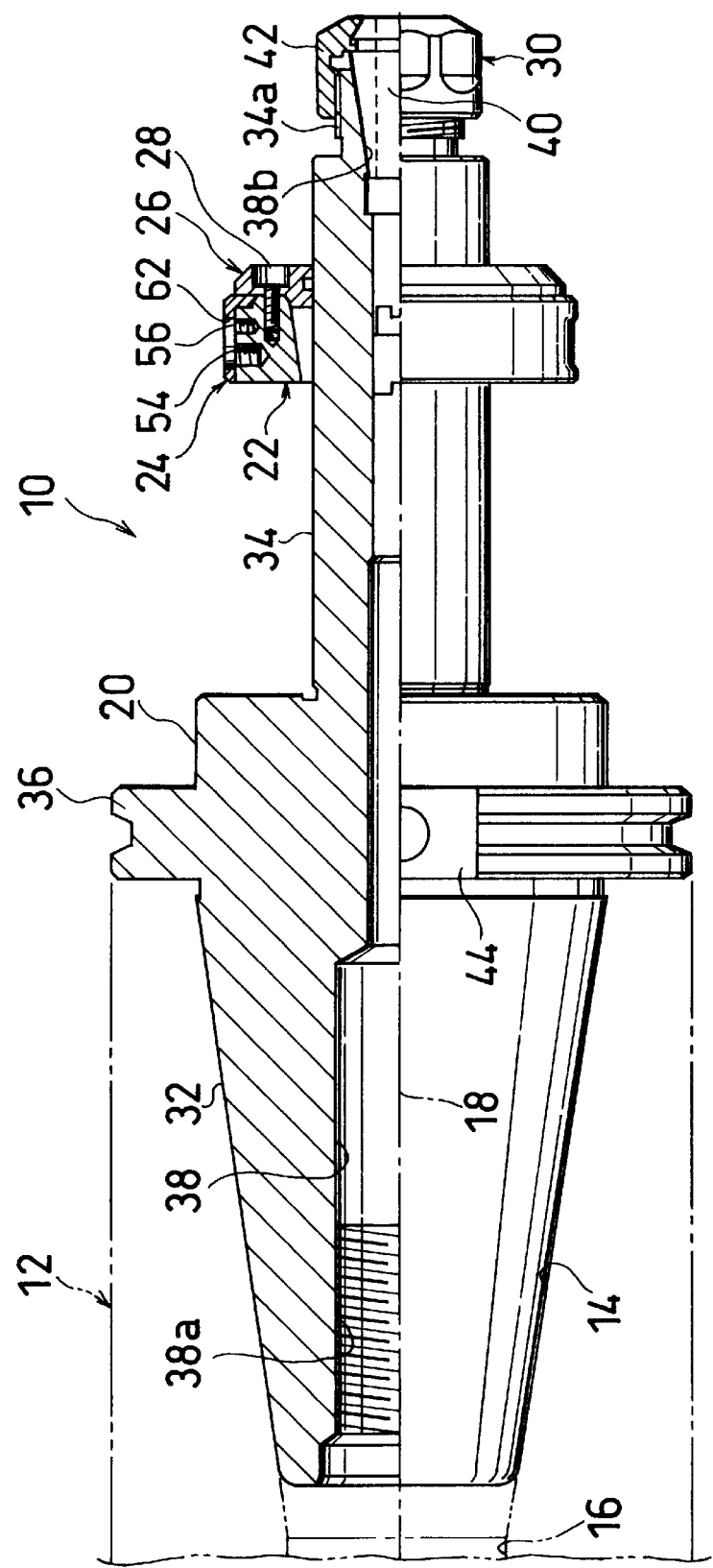
FIG. 1 is a front elevational view partly in section showing an embodiment of a tool holder according to the present invention.
Figure 2:
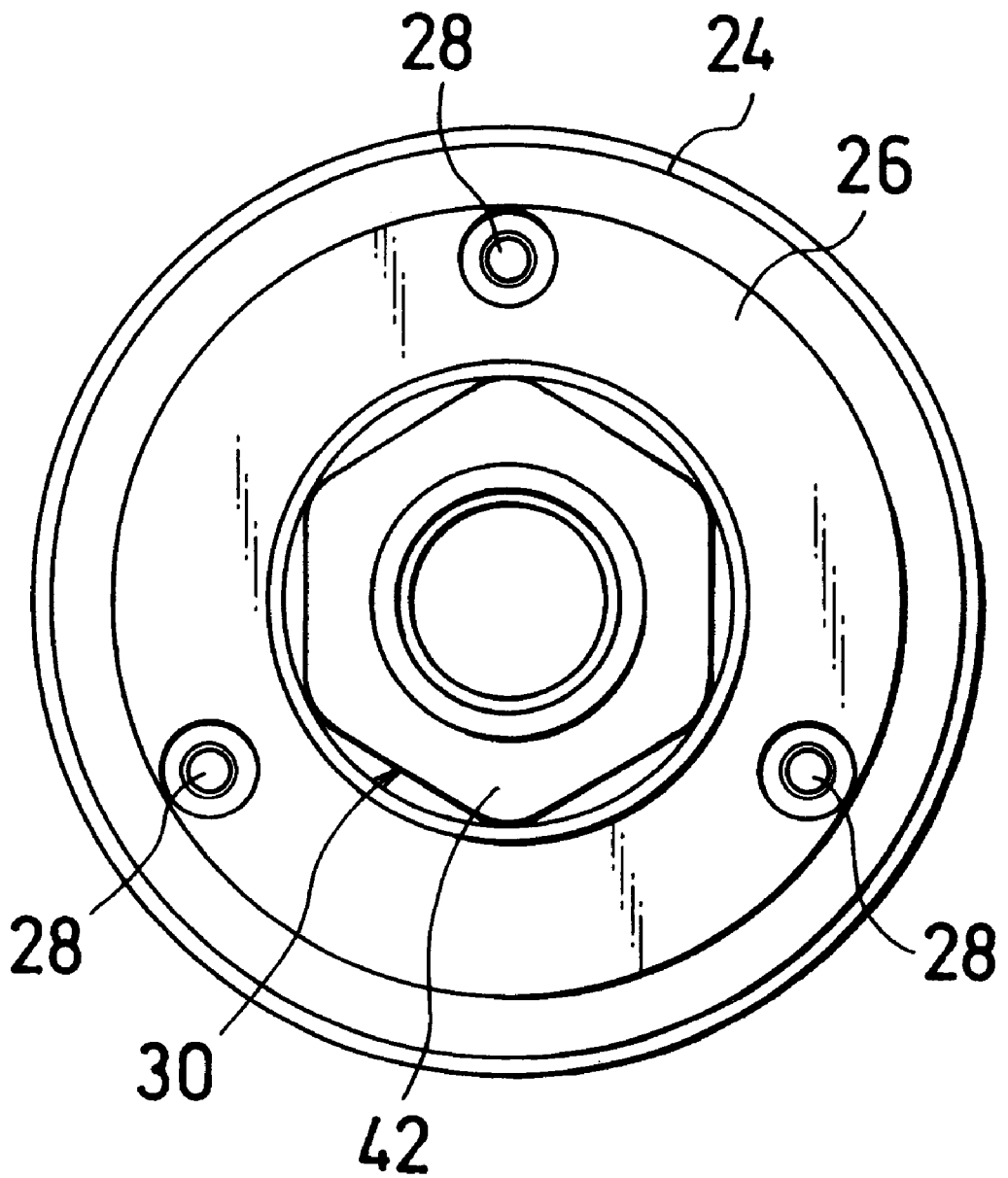
FIG. 2 is a right-hand side elevational view of the tool holder shown in FIG. 1.
Figure 3:
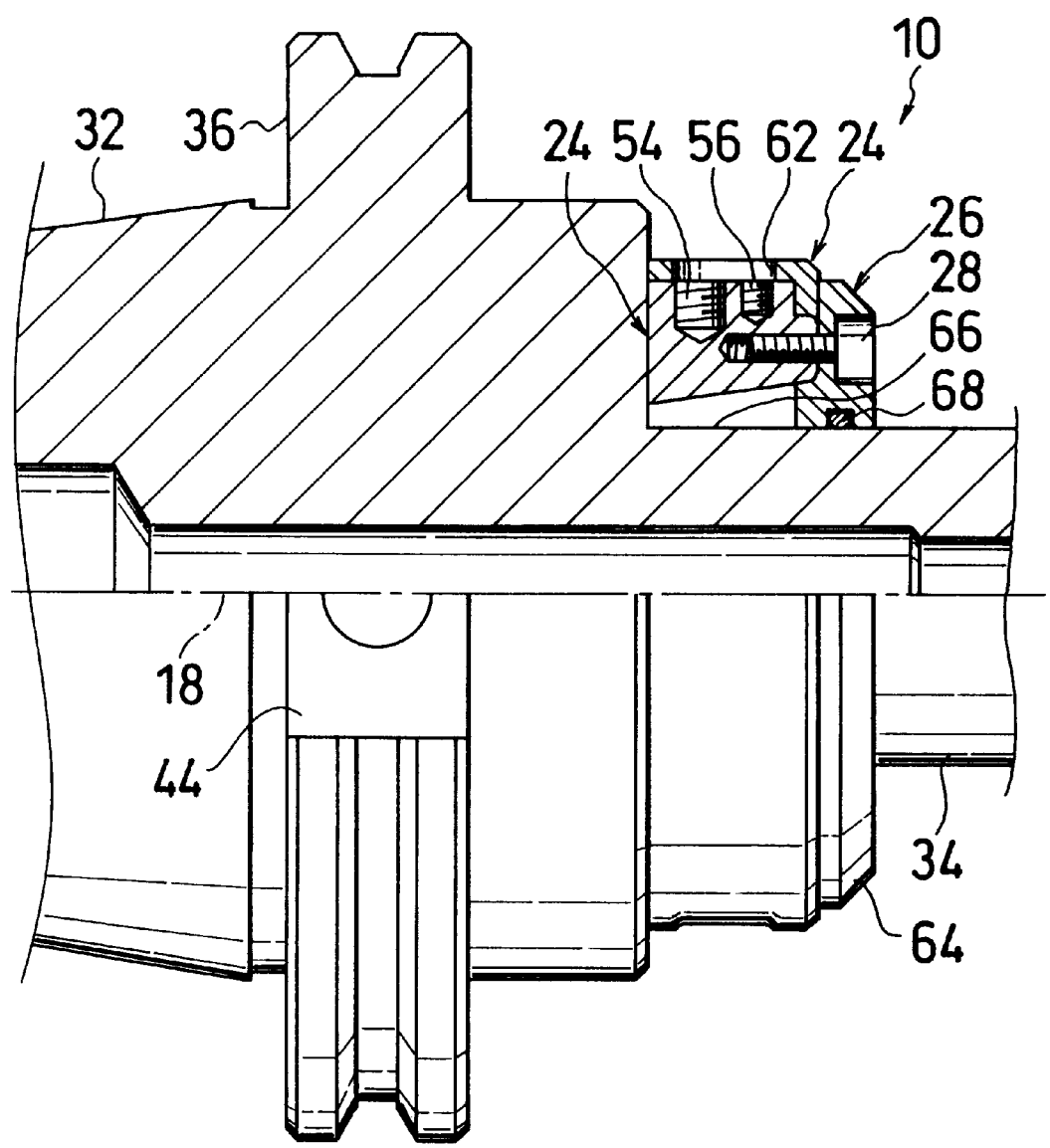
FIG. 3 is a view illustrating a condition of the tool holder shown in FIG. 1 wherein a ring is attached to another position.

Referring to FIGS. 1 to 3, a tool holder 10 is used as a collet chuck for attaching a rotating tool to a rotary shaft 12 of a machine tool. The rotary shaft 12 has a hole 14 which is opened in one end face thereof to allow the tool holder 10 to be removably attached, and a hole 16 coaxially continuing to the hole 14. The hole 16 has a truncated conical shape whose diameter increases toward the end face side of the rotary shaft 12. The tool holder 10 is attached to the rotary shaft 12 such that an axis 18 thereof may be aligned with an axis of the rotary shaft 12.

The tool holder 10 includes a holder body 20, a balancing ring 22 disposed on the holder body, a ring-shaped cover 24 for receiving the ring 22, an annular assembling device 26 for removably assembling the ring 22 to the holder body 20, a plurality of assembling screws 28 for removably assembling the assembling device 26 to the ring 22, and a chuck 30 for removably assembling a tool to the ring body 20.

The holder body 20 has a first section (shank portion) 32 inserted in the hole 14 of the rotary shaft 12, a second section (tool attaching portion) 34 to which the tool is attached by means of the chuck 30 and which coaxially continues to the first section, and a flange 36 at a boundary portion between the first and second sections 32 and 34. The first section 32 has a truncated conical shape similar to that of the hole 14.

The holder body 20 further has a through-hole 38 extending therethrough in the direction of the axis 18. A portion of the through-hole 38 on the first section 32 side is formed as a threaded hole 38a, and an end portion of the through-hole 38 on the second section 34 side is formed as a truncated conical hole 38b whose diameter increases towards the end face side of the holder body 20.

The chuck 30 has a collet (that is, sleeve) 40 inserted into the truncated conical hole 38b to grip the tool, and a lock nut 42 screwed into a threaded portion 34a formed at an end portion of the second section 34 on the tool attaching side to push the collet 40 into the hole 38b. An outer peripheral face of the collet 40 is formed in a truncated conical shape such that the diameter thereof decreases toward the interior of the hole 38b so that the collet 40 may fit into the hole 38b.

The flange 36 is a gripping flange to be gripped by an automatic tool exchanging machine and has a plurality of recesses 44 for receiving a projection (drive key) of the rotary shaft 12 to receive rotation of the rotary shaft 12.

As particularly shown in FIGS. 3, 4(A), 4(B) and 4(C), the ring 22 has a shape of an annular disk having a center hole, that is, a through-hole 46 coaxial with the holder body 20. The ring 22 includes a plurality of threaded holes 48 into which the assembling screws 28 are screwed, and a plurality of first and second holes 50 and 52 provided in an equally angularly spaced relationship from each other around the through-hole 46.

An inner circumferential face of the ring 22, that is, the through-hole 46, has a truncated conical shape whose diameter gradually decreases from the one face side to the other face side of the ring 22 in a direction of the thickness of the ring 22. The smallest portion of the through-hole 46 has a diameter a little larger than the diameter of the second section 34.

The assembling threaded holes 48 are formed, in the example shown, at three locations equally angularly spaced from each other around the axis 18 on the center side with respect to the holes 50 and 52, and are opened in one face in the direction of the thickness.

The holes 50 and 52 are opened in the outer face of the ring 22 and spaced from each other in the direction of the axis 18 of the holder body 20. The holes 50 and 52 are threaded holes having different sizes from each other. A balancing member 54 or 56 is disposed in one or more of the holes, that is, screw holes 50 or 52. Accordingly, in the example shown, the balancing members 54 and 56 are screws 54 and 56, respectively.

As particularly shown in FIGS. 3, 5(A), 5(B) and 5, the cover 24 has a tubular portion 58 fitted into the ring 22 so as to close the holes 50 and 52 in such a manner that they may be opened, and an inwardly directed flange 60 extending inwardly from an end of the tubular portion 58. The cover 24 further has, in the tubular portion 58 thereof, one or more holes 62 which are elongated in the direction of the axis 18 in order to open and close the holes 50 and 52. The holes 62 are formed, in the example shown, at two locations equally angularly spaced from each other around the axis 18.

As particularly shown in FIGS. 3, 6(A), 6(B) and 6(C), the assembling device 26 has a base section 64 continuously extending around the second section 34, and an engaging section 66 extending toward the axis 18 from the base section 64. The base section 64 has, in the example shown, a flange-like shape and has, on an inner circumferential face thereof, an annular recess in which an O-snap ring 68 is disposed.

The base section 64 further has a plurality of holes 70 through which the screws 28 extend. The holes 70 are stepped holes having steps in which the head portions of the screws 28 can be accepted completely, and are respectively formed at three locations equally angularly spaced from each other around the axis 18.

The engaging section 66 is divided into a plurality of wedge-shaped members or tougues angularly spaced from each other around the axis 18 by a plurality of slits 72 which extend from the base section 64 to an end of the engaging section 66. An outer circumferential face of the engaging section 66 has a truncated conical shape whose diameter is larger toward one side of the ring 22 in a direction of the thickness than toward the other side so that it may correspond to the shape of the inner face of the ring 22.

Figure 4A:
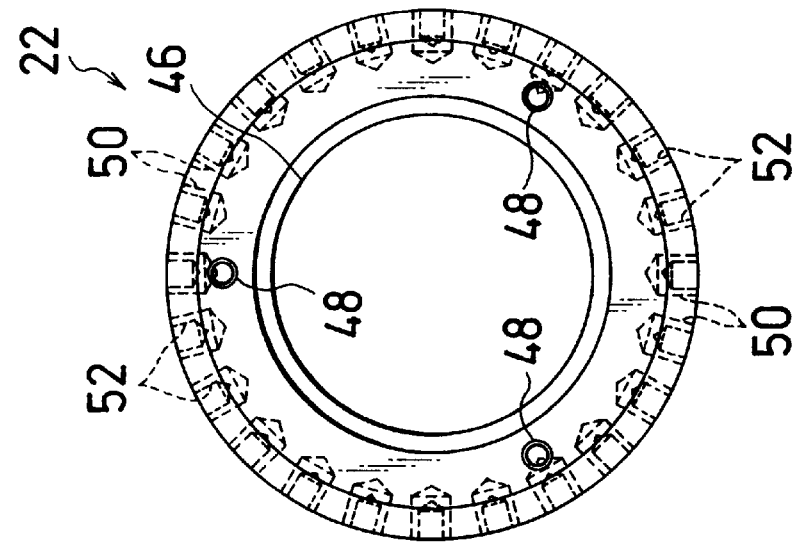
FIG. 4(A) is a view showing an embodiment of a ring for use with the tool holder shown in FIG. 1, and is a left-hand side elevational view.
Figure 4B:
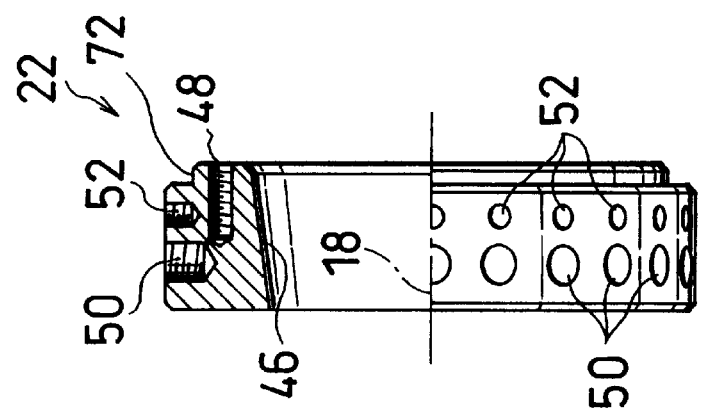
FIG. 4(B) is a front elevational view partly in section.
Figure 4C:
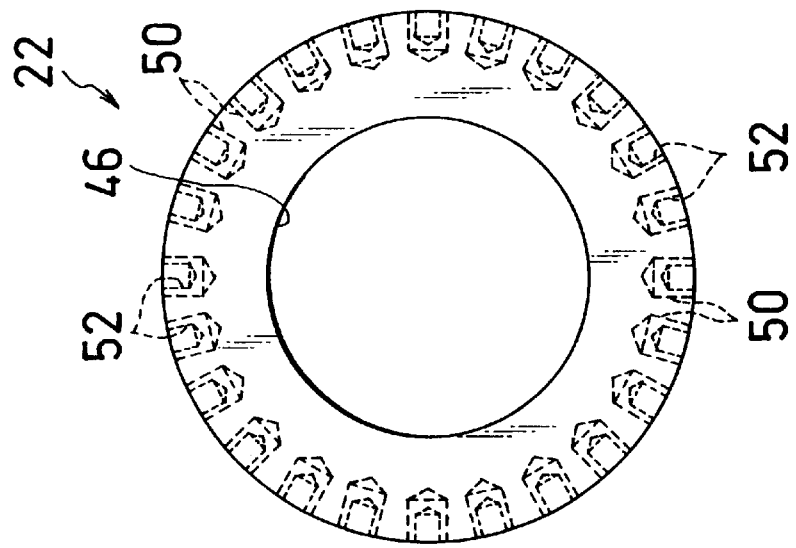
FIG. 4(C) is a right-hand side elevational view.

The ring 22, cover 24 and assembling device 26 can be assembled to the second section 34 of the holder body 20, for example, by disposing the ring 22, cover 24 and assembling device 26 in this order onto the second section 34 from the chuck 30 side, disposing the ring 22 into the internal space of the cover 24, positioning the flange 60 of the cover 24 at a stepped portion 72 (refer to FIG. 4(B)) provided on the ring 22, inserting the engaging section 66 of the assembling device 26 between the ring 22 and the second section 34, and screwing the screws 28 into the threaded holes 48 of the ring 22 through the holes 70 of the cover 24.

However, the ring 22 and the cover 24 may be coupled loosely with each other in advance, or the ring 22, cover 24 and assembling device 26 may be coupled loosely with each other in advance.

The engaging section 66 of the assembling device 26 is inserted between the second section 34 of the holder body 20 and the ring 22 and is frictionally engaged with the outer face of the second section 34 and the inner face of the ring 22. Further, the flange 60 of the cover 24 is held between the ring 22 and the assembling device 26 so that, when the tool holder 10 rotates, the cover 24 may be prevented from coming off the ring 22.

In a condition where the ring 22, cover 24 and assembling device 26 are assembled to the second section 34 in such a manner as described above, there is no possibility that the ring 22 and the assembling device 26 may move relative to each other, and accordingly, loosening and cancellation of the assemblage of the ring 22 and the second section 34 by the assembling device 26 is prevented.

In use, a predetermined tool is first attached to the rotary shaft 12 of the holder body 20 assembled in such a manner as described above, and in this condition, the rotary shaft 12 is rotated and the direction of imbalance and the imbalance amount are measured.

Then, the screws 28 are loosened a little to such a degree that the ring 22 is not rotated by its own weight, vibrations or the like relative to the holder body 20. In this condition, the cover 24 is rotated relative to the ring 22 so that a hole 62 may open a hole 50 or 52 which corresponds to the measured direction of the imbalance.

Then, a balancing member 54 or 56 corresponding to the measured imbalance amount is disposed into the predetermined hole 50 or 52. When the balancing members 54 or 56 are to be disposed into a plurality of the holes 50 or 52, the process of rotating the cover 24 relative to the ring 22 to open a hole 50 or 52 and disposing a balancing member 54 or 56 into the hole 50 or 52 is repeated.

Thereafter, the cover 24 is rotated a little relative to the ring 22 so that it may cover the holes 50 and 52, and the screws 28 are tightened strongly. When the engaging section 66 is inserted between the ring 22 and the second section 34, the engaging section 66 grips the second section 34, and is engaged with the inner face of the ring 22. Consequently, the ring 22, cover 24 and assembling device 26 are coupled together and attached to the holder body 20.

In a condition where the ring 22, cover 24 and assembling device 26 are attached to the holder body 20, the cover 26 closes the holes 50 and 52. Consequently, when the tool holder 10 rotates, there is no possibility that the balancing member jumps out from the hole, which provides safety.

With the tool holder 10, since the engaging section 66 of the assembling device 26 is positioned like a wedge between the second section 34 and the ring 22, the ring 22 can be disposed at a suitable position in the direction of the axis 18. For example, in FIG. 1, the ring 22 is disposed on the side of an end of the second section 34 (on the side of the chuck 30), and in FIG. 3, the ring is disposed on the side of the flange 36. Consequently, with the tool holder 10, the position at which balancing in weight should be performed can be changed.

Changing of the assembled position of the ring 22 to the second section 34 can be performed by loosening the screws 28 to cancel the assemblage of the ring 22 and the second section 34 by the assembling device 26, moving the ring 22 to a predetermined position in the direction of the axis 18 and tightening the screws 28 at this position to engage the assembling device 26 with the ring 22 and the second section 34.

With the tool holder 10, since the ring 22, cover 24 and assembling device 26 can be assembled to the holder body 20 from the chuck 30 side, the flange 36 does not make an obstacle to the assembling operation, and the assembling operation is easy. Further, since the inner face of the ring 22 and the outer face of the engaging section 66 have a truncated conical shape, the ring 22 and second section 34 can be assembled and disassembled by the engaging section 66 with certainty and with ease.

While, in the embodiment described above, the holes 50 and 52 extend in radial directions of the ring 22 and are both opened in the outer face of the ring 22, they may be holes which extend in a direction of the thickness of the ring 22.

Figure 7:
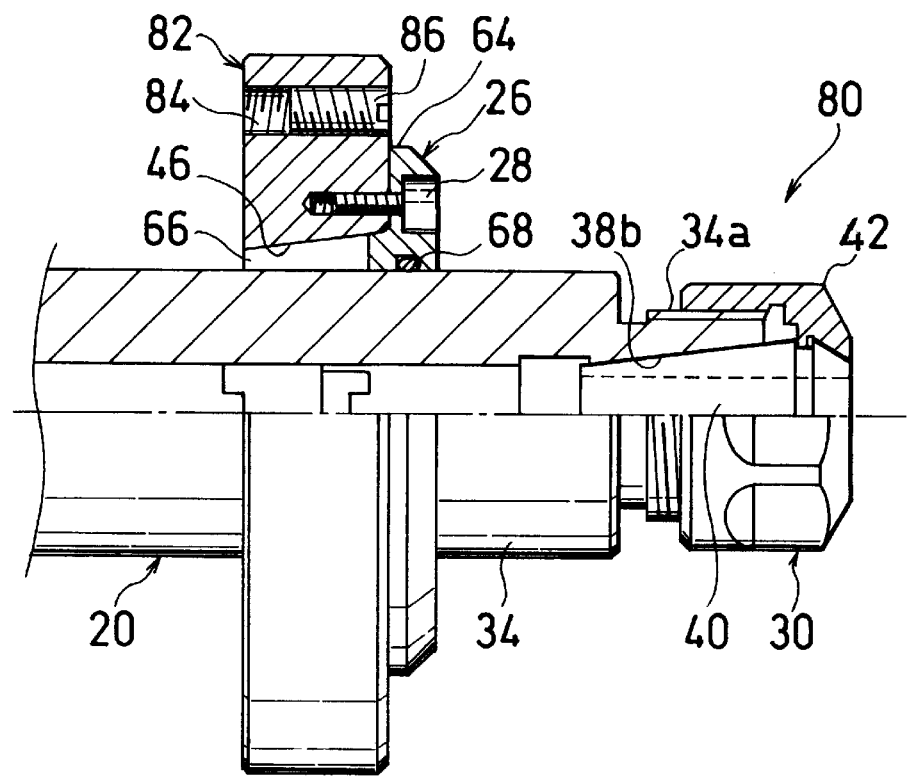
FIG. 7 is a front elevational view partly in section showing an embodiment of a tool holder according to the present invention.
Figure 8:
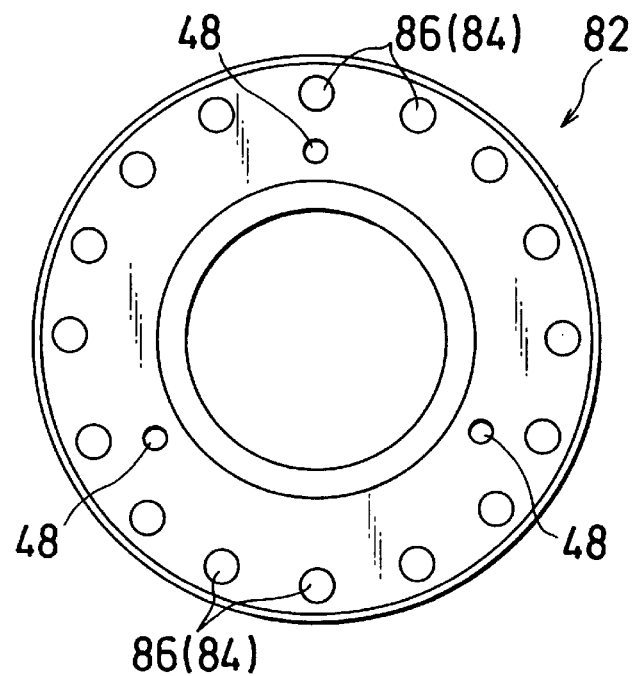
FIG. 8 is a view showing an embodiment of a ring for use with the tool holder shown in FIG. 7.

Referring to FIGS. 7 and 8, a ring 82 of a tool holder 80 has a plurality of holes 84 equally angularly spaced from each other around an axis 18. A screw 88 acting as a balancing member is screwed into one or more of the holes 84 in accordance with the direction of imbalance to be eliminated.

The holes 84 in the example shown extend in a direction of the thickness of the ring 22 and extend through the ring 82 in the direction of the thickness. However, the holes 84 may be blind holes which are opened only in one face of the ring 82 in the direction of the thickness, preferably in the face on the side of the chuck 30. Alternatively, the holes 84 may extend in parallel to the axis 18 or may extend in directions having angles with respect to the axis 18, for example, in directions with which they come outwardly or inwardly in radial directions toward the flange 36.

The ring 82 can be attached to the holder body 20 by disposing the ring 82 onto the second section 34 from the chuck 30 side, inserting, in this condition, the engaging section 66 of the assembling device 26 between the ring 82 and the second section 34 from the chuck 30 side and coupling the ring 82 and the assembling device 26 by means of the screws 28. In order to release the ring 82 from the holder body 20, the operations reverse to those described above should be performed.

The present invention is not limited to the embodiments described above. For example, in any of the embodiments described above, the ring itself does not have imbalance in weight. However, the ring itself may have imbalance in weight, and in this instance, a ring corresponding to the imbalance to be eliminated is selected and disposed such that the direction of the imbalance of the ring may be the direction of the imbalance to be eliminated. Further, in place of using a ring formed from a single disk, a ring formed from a plurality of members may be used.

What is claimed is:

1. A tool holder comprising;
   a holder body having a first section to be attached to a machine and a second section having a substantially constant diameter and coaxial with said first section;
   a ring extending around said second section; and
   an assembling device for removably assembling said ring to said holder body;
   said assembling device being releasably engaged with an inner face of said ring and an outer face of said second section.

2. A tool holder according to claim 1, wherein said assembling device has an annular base section continuously extending around said second section, and an engaging section extending in an axial direction of said holder body from said base section, said engaging section being disposed between said ring and said second section for engaging with said inner face of said ring and said outer face of said second section.

3. A tool holder according to claim 2, wherein said inner face of said ring or said outer face of said engaging section has a truncated conical shape whose diameter is larger on one side than the other side of said ring in the axial direction of said holder body.

4. A tool holder according to claim 2, wherein said engaging section is divided into a plurality of tongues angularly spaced from each other around an axis of said holder body with a plurality of slits.

5. A tool holder according to claim 2, wherein said base section is assembled to one face of said ring in the axial direction of said holder body by means of a plurality of screws.

6. A tool holder according to claim 1, wherein said ring has a plurality of holes opened in at least one of faces in an axial direction of said holder body and spaced angularly from each other around the axis.

7. A tool holder according to claim 1, wherein said ring has a plurality of holes opened in said outer face thereof and spaced angularly from each other around the axis of said holder body.

8. A tool holder according to claim 7, further comprising a ring-shaped cover in which said ring is received so as to close said holes in such a manner as they may be opened.

9. A tool holder according to claim 8, wherein said cover has one or more openings which can be aligned with said hole.

10. A tool holder according to claim 8, wherein said cover has an inwardly directed flange held between said ring and said assembling device.

* * * * *